United States Patent [19]

Turner et al.

[11] 3,992,585

[45] Nov. 16, 1976

[54] SELF-ENERGIZING ELECTROSTATIC LOUDSPEAKER SYSTEM

[75] Inventors: Jacob C. Turner; Douglas M. Elliott, both of Milwaukee, Wis.; Robert M. Grodinsky, Skokie; Thomas F. Mills, Chicago, both of Ill.

[73] Assignee: Koss Corporation, Milwaukee, Wis.

[22] Filed: Oct. 6, 1975

[21] Appl. No.: 620,537

[52] U.S. Cl. ............................. 179/1 R; 179/1 VC; 179/111 R
[51] Int. Cl.² ......................................... H04R 3/00
[58] Field of Search ............. 179/1 R, 1 VC, 111 R, 179/111 E

[56] References Cited
UNITED STATES PATENTS 3,305,638  2/1967  Teachout ........................ 179/111 R
3,449,523  6/1969  Kishi et al. ..................... 179/111 R

FOREIGN PATENTS OR APPLICATIONS 1,147,423  4/1969  United Kingdom ............. 179/111 E Primary Examiner—George G. Stellar
Attorney, Agent, or Firm—Quarles & Brady

[57] ABSTRACT

A power supply for generating polarizing voltages for the drivers on an electrostatic speaker system includes a charging circuit which charges a battery from the applied audio signal. A dc-to-dc converter generates the relatively high polarizing voltages from the battery voltage and it includes an oscillator which generates an alternating voltage to a voltage multiplier circuit. An electronic switch circuit turns the oscillator on when an audio signal is present and turns it off a preselected time interval after the audio signal is removed.

10 Claims, 1 Drawing Figure

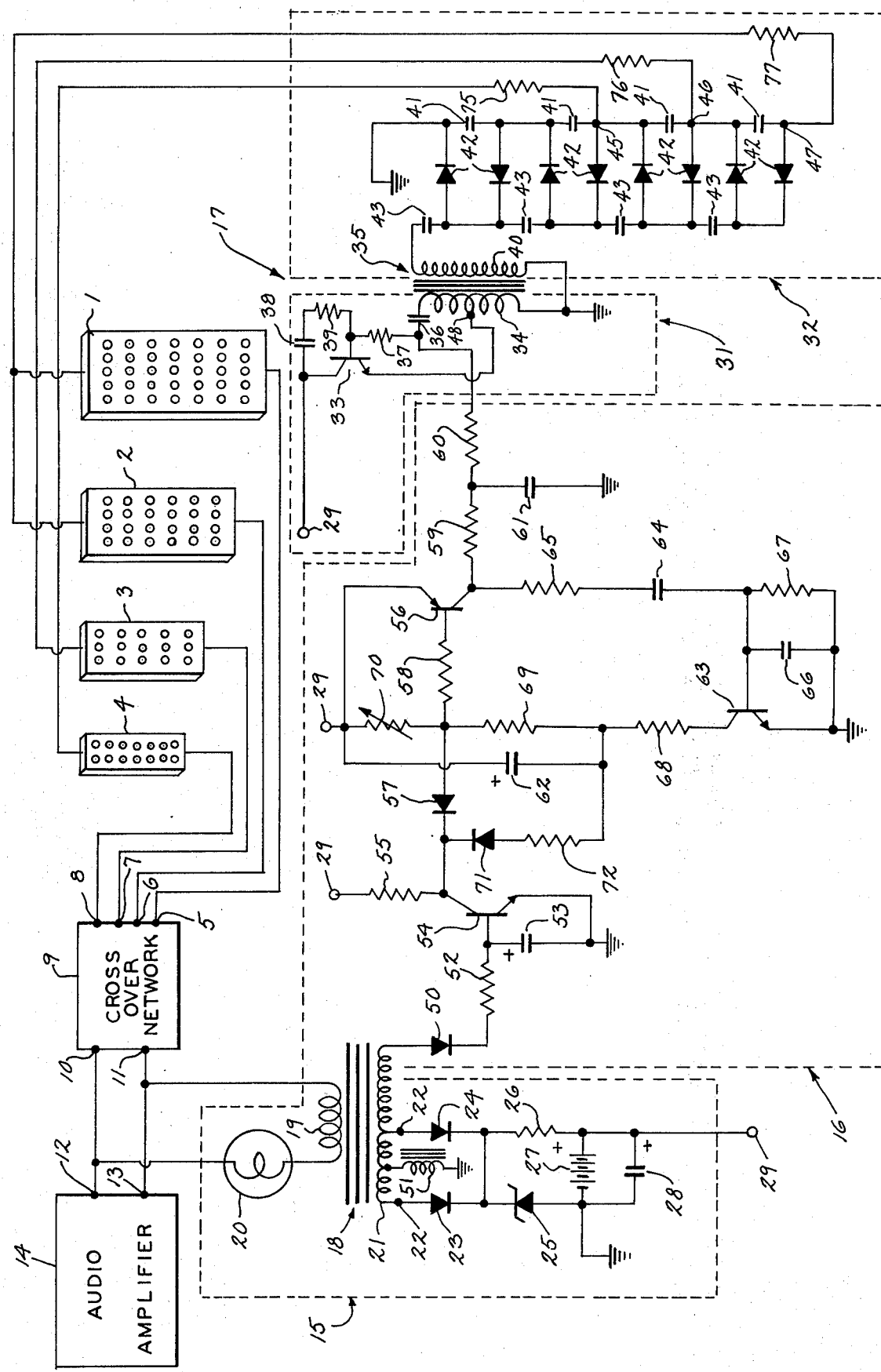

3,992,585

SELF-ENERGIZING ELECTROSTATIC LOUDSPEAKER SYSTEM

BACKGROUND OF THE INVENTION

The field of the invention is high fidelity electrostatic speaker systems and more particularly, high voltage power supplies for providing the polarizing voltage for the diaphragm of an electrostatic driver in such a system.

The advantages of electrostatic type audio drivers is well known and there are numerous commercially available headphone and loudspeaker systems which employ them in lieu of the more conventional dynamic audio driver. To operate an electrostatic driver, however, a relatively high polarizing voltage must be applied to its movable diaphragm with the result that a separate high voltage power supply must be provided with the speaker system. In an electrostatic loudspeaker system, the high voltage power supply is typically mounted within the speaker enclosure and is powered by house current which is obtained by plugging the system into an electrical outlet. As a result, the loudspeaker must be positioned near an electrical outlet or unsightly extension cords must be used.

In U.S. Pat. No. 3,632,903, issued to Martin Lange, Jr., on Jan. 4, 1972, and entitled "Electrostatic Headphone," a circuit for generating a polarizing voltage from the applied audio signal is disclosed. A voltage multiplier circuit is connected to the secondary winding of a transformer which receives the applied audio signal and a capacitor is charged to the desired polarizing voltage level by a voltage multiplier circuit. Such "self-energizing" high voltage power supplies have proven quite satisfactory when used with relatively small electrostatic drivers that do not consume significant amounts of power. As a result, such self-energizing high voltage power supplies have been commercially applied to electrostatic headphones and to relatively small electrostatic loudspeakers designed to reproduce higher audio frequencies.

When large electrostatic drivers are used in a loudspeaker system to reproduce the lower audio frequencies, significantly larger amounts of power must be generated by the high voltage power supply. Because this additional power must be obtained from the applied audio signal in a self-energizing loudspeaker system, the task of diverting a portion of the power in the applied audio signal without distorting it is significantly more difficult. Also, the conversion of the applied audio signal to a high dc polarizing voltage must be performed efficiently.

SUMMARY OF THE INVENTION

The present invention relates to a self-energizing high voltage power supply for a full range electrostatic loudspeaker system. More specifically, the high voltage power supply of the present invention includes a rechargeable battery which is operable when charged to generate a relatively low dc voltage, a charging circuit operable to generate a charging current for the battery from an applied audio signal, a dc-to-dc converter circuit which connects to the battery and is operable to generate the high polarizing voltage from the battery voltage, and a switch for actuating the dc-to-dc converter circuit when an audio signal is present.

A general object of the invention is to derive a polarizing voltage for the electrostatic drivers on a full range loudspeaker system from the applied audio signal. When the audio signal is large power sufficient to generate the polarizing voltage and charge the battery can be extracted without causing distortion. At lower levels, or when no audio signal is present, as may occur when changing a record or tape, the polarizing voltage is derived from power supplied by the battery.

Another object of the invention is to efficiently generate a polarizing voltage from the applied audio signal. The switch includes a detector circuit which connects to sense the presence of an audio signal and turn the dc-to-dc converter on and off as indicated. The battery is thus not discharged when the system is inoperative, but the high voltage power supply is automatically actuated when an audio signal is applied to the speaker system.

A more specific object of the invention is to keep the power supply operable for a short time period after the audio signal is removed. A time delay circuit is included which maintains the dc-to-dc converter in its actuated state for a time interval sufficient for a record or tape to be changed.

Another object of the invention is to generate a polarizing voltage without distorting the audio signal. To prevent damage to the rechargeable battery, the charging current is limited to a present level which is reached when the audio signal attains a reasonably high listening level. A voltage responsive impedance device is included to prevent distortion of the audio signal when it reaches higher levels by effectively decoupling the charging circuit from the audio signal source.

The foregoing and other objects and advantages of the invention will appear in the following description. In the description reference is made to the accompanying drawings which form a part hereof, and in which there is shown by way of illustration a preferred embodiment of the invention. Such embodiment does not necessarily represent the full scope of the invention and reference is made to the claims herein for interpreting the breadth of the invention.

BRIEF DESCRIPTION OF THE DRAWING

The drawing is an electrical schematic diagram of the invented high voltage power supply.

DESCRIPTION OF THE PREFERRED EMBODIMENT

The high voltage power supply of the present invention is embodied in a four-way electrostatic loudspeaker system which includes a bass electrostatic driver 1, a mid bass electrostatic driver 2, a treble electrostatic driver 3, and a tweeter electrostatic driver 4. The rigid plate elements on each of the drivers 1–4 are connected to respective output terminals 5–8 on a four-way crossover network 9 and a pair of input terminals 10 and 11 on the crossover 9 connect to output terminals 12 and 13 on an audio amplifier 14. As is well known in the art, the crossover network 9 serves to divide the audio spectrum into narrower frequency ranges which are then applied to the appropriately designed electrostatic drivers 1, 2, 3 or 4. For a more detailed description of the crossover network 9 and drivers 1–4, reference is made to the copending patent application Ser. No. 481,533, filed on June 21, 1974 and entitled "Crossover Network for a Multi-Element Electrostatic Loudspeaker System".

The bias, or polarizing voltage power supply for the drivers 1–4 includes a charging circuit indicated generally by the dashed lines 15, an electronic switch circuit indicated generally by the dashed lines 16 and a dc-to-dc converter circuit indicated generally by the dashed lines 17. The charging circuit 15 includes an iron core transformer 18 which has a primary winding 19 that connects to the output terminals 12 and 13 on the audio amplifier 14 through an incandescent lamp 20. A secondary winding 21 on the transformer 18 includes a first section having a center tap which connects to circuit ground through an audio choke 51. A pair of terminals 22 on this section connect through a full-wave rectifier circuit comprised of diodes 23 and 24 to the cathode of a zener diode 25 which in turn connects to circuit ground. The output of the rectifier circuit also connects through a current limiting resistor 26 to the positive terminal of a rechargeable battery 27 and to the positive lead on a filter capacitor 28. The negative terminal of the rechargeable battery 27 and the negative lead of the filter capacitor 28 connect to signal ground.

When an audio signal appears at the output terminals 12 and 13 of the amplifier 14 a voltage is induced in the secondary winding 21 of the transformer 18 and is rectified by the diodes 23 and 24 to provide a charging current to the rechargeable battery 27. The primary winding 19 on the transformer 18 includes 35 bifilar wound turns which are series connected to provide 70 effective turns. The secondary winding 21 includes 1120 turns between the terminals 22 to provide a substantial step-up of the applied audio signal. The audio choke 51 serves to smooth the rectified audio signal and to thereby reduce the higher order, non-linear effects which might otherwise be reflected into the primary winding 19 as a non-linear impedance.

The rechargeable battery 27 is a six-volt, one amp-hour rechargeable battery such as that disclosed in U.S. Pat. No. 3,257,237. The zener diode 25 has a breakdown voltage of 7.2 volts and the value of the current limiting resistor 26 is selected to limit the charging current to 20 milliamperes when the battery 27 is fully charged. The output of the charging circuit 15 is 6.2 volt dc voltage which appears at an output terminal 29. Although this voltage is far too low to polarize the electrostatic drivers 1–4, it remains relatively constant in value during all operating conditions, including long periods of silence or low level operation.

The incandescent lamp 20 is a 150-watt, 115–125 volt commercially available lamp which operates as a low impedance varistor. The lamp 20 provides a nominal six-ohm impedance when the audio signal is relatively small or absent, and a nominal impedance of 22 ohms when the audio signal increases to a level sufficient to break down the zener diode 25. As a result, the charging circuit 15 presents a substantially higher impedance across the output terminals 12 and 13 of the audio amplifier 14 when the audio signal is large in magnitude. A smaller share of the generated audio power is thus diverted to charge the battery 27 at high audio levels and the series connected voltage dependent lamp 20 provides more efficient operation at high operating levels and prevents distortion of the audio signal at these operating levels.

The dc-to-dc converter 17 is connected to the charging circuit output terminal 29 and operates to boost the relatively low dc output voltage to a relatively high polarizing voltage suitable for application to the electrostatic drivers 1–4. The dc-to-dc converter 17 includes an oscillator circuit which is indicated generally by the dashed lines 31 and a voltage multiplier circuit which is indicated generally by the dashed lines 32. The oscillator circuit 31 includes an NPN transistor 33 which has its collector connected to the charging circuit output terminal 29 and its emitter connected to a tap 48 on the primary winding 34 of a step-up transformer 35. One end of the primary winding 34 is connected to circuit ground and the other end of the winding 34 provides positive feedback to the base of the NPN transistor 33 through a series connected feedback capacitor 36 and feedback resistor 37. A series connected capacitor 38 and resistor 39 also couple the base of the transistor 33 to the charging circuit output terminal 29.

The inductance of the tapped portion of the primary winding 34 on the transformer 35 and its associated distributed capacitance provides a tuned circuit which resonates at approximately 5 kHz. The feedback capacitor 36 and resistor 37 in combination with the capacitor 38 and resistor 39 provide sufficient positive feedback to the transistor 33 at this frequency to maintain oscillations. Neither the frequency nor the wave shape of the oscillator output is particularly crucial, and instead, the primary objective of the oscillator circuit 31 is to generate a voltage which varies substantially as a function of time. The voltage fluctuations in the primary winding 34 establish a magnetic field in the step-up transformer 35 which induces a stepped-up voltage in its secondary winding 40. It should be apparent to those skilled in the art that other circuits, such as pulse generating circuits, are suitable for establishing a time varying voltage which can be stepped up in value.

The transformer 35 is a ferrite core transformer and its primary winding 34 includes 220 turns, 200 of which are made to the ground side of the tap 48. The secondary winding 40 includes 20,000 turns and a substantial voltage boost is thus obtained and is applied to the voltage multiplier circuit 32. The voltage multiplier circuit 32 is a series of voltage doublers which include a set of charging capacitors 41, a set of diodes 42 and a set of coupling capacitors 43. As is well known in the art, the time varying voltage applied to the voltage multiplier circuit is coupled through the successive capacitors 43 to charge the capacitors 41. The voltages thus established across the charging capacitors 41 are additive to provide a polarizing voltage of approximately 2 kilovolts at a first output terminal 45, a polarizing voltage of approximately 3.3 kilovolts at a second output terminal 46 and a polarizing voltage of approximately 6.2 kilovolts at a third output terminal 47. The 2 kilovolt output terminal 45 connects through a coupling resistor 75 to the diaphragm on the tweeter driver 4 and the 3.3 kilovolt output terminal 46 connects through a coupling resistor 76 to the diaphragm on the treble driver 3. The 6.2 kilovolt output terminal 47 connects through a coupling resistor 77 to the diaphragms on the base and mid base drivers 1 and 2. It should be apparent to those skilled in the art that the turns ratio on the transformer 35 and the number of stages in the voltage multiplier circuit 32 can be varied to obtain the polarizing voltages needed for the particular electrostatic driver configuration used. Also, a second voltage multiplier circuit can be connected to the secondary of the transformer 35 to generate corresponding negative polarizing voltages.

The electronic switch circuit 16 operates to automatically turn the oscillator circuit 31 on and off in response to the output of the audio amplifier 14. The presence of an audio signal is detected by a 2100 turn section of the secondary winding 21 on the transformer 18 which connects through a rectifier diode 50 and through a filter resistor 52 to a grounded filter capacitor 53 and to the base of an NPN detector transistor 54. The emitter of the detector transistor 54 is connected to circuit ground and its collector is connected through a load resistor 55 to the changing circuit output terminal 29. When an audio signal is present at the output of the amplifier 14, a voltage is induced in the secondary winding 21 of the transformer 18 which charges the filter capacitor 53. The base-emitter junction of the detector transistor 54 becomes forward biased and the transistor turns on. The voltage at the collector of the transistor 54 thus drops substantially to a value slightly above that of signal ground.

The detector transistor 54 drives a PNP switching transistor 56. The base of the switching transistor 56 couples to the collector of the detector transistor 54 through a coupling diode 57 and a series connected coupling resistor 58. The emitter of switching transistor 56 connects to the charging circuit output terminal 29 and its collector connects through a pair of series connected resistors 59 and 60 to the resistor 37 in series with the base of oscillator transistor 33. A capacitor 61 couples the junction of the resistors 59 and 60 to signal ground and together these elements serve as a filter which isolates the oscillator signal from the electronic switch circuitry. When the detector transistor 54 turns on, the base-emitter junction of the switching transistor 56 becomes forward biased and the switching transistor 56 turns on to provide base current for the oscillator transistor 33 through the resistors 59 and 60. The oscillator circuit 31 is thus actuated when an audio signal is present at the output of the amplifier 14.

To prevent the electronic switch circuit 16 from deactuating the oscillator circuit 31 every time a pause occurs in the audio signal at the audio amplifier 14, a time delay circuit is provided to keep the switching transistor 56 turned on for a preset time interval. This time delay circuit includes a charging capacitor 62 which has a positive lead connected to the charging circuit output terminal 29 and a negative lead connected through a transistor 63 to circuit ground. The base of the transistor 63 couples to the collector of the switching transistor 56 through a series connected capacitor 64 and resistor 65 and is connected to circuit ground through parallel connected capacitor 66 and resistor 67. When the switching transistor 56 is turned on the charging transistor 63 is momentarily turned on by a surge of base current coupled through the capacitor 64. The negative lead on the charging capacitor 62 is thus momentarily coupled to signal ground through the transistor 63 and it is charged to a preset voltage. A current limiting resistor 68 connects to the collector of the transistor 63 to limit the magnitude of this charging current.

The charging capacitor 62 connects in parallel with a pair of voltage divider resistors 69 and 70 and the junction point of the resistors 69 and 70 is connected to the base of the switching transistor 56 through the coupling resistor 58. After the capacitor 62 has been fully charged, therefore, it will provide base current to the switching transistor 56 for a preselected time interval which is determined by the value of the resistor 70. As long as an audio signal is sensed by the detector transistor 54 the capacitor 62 is maintained fully charged by a conductive path provided by series connected diode 71 and resistor 72, which connect its negative lead to the collector of the detector transistor 54. When the audio signal is removed and the detector transistor 54 turned off, the charging capacitor 62 provides base current to the switching transistor 56 for a preselected time interval and thus maintains the oscillator circuit 31 in its actuated state. If the audio signal is not reestablished in that time interval, the capacitor 62 discharges to a point where the base-emitter junction on the switching transistor 56 becomes reverse biased and the oscillator circuit 31 is deactuated.

We claim:

1. In an electrostatic loudspeaker system connected to receive an audio signal at an input terminal, a high voltage power supply for providing a polarizing voltage for an electrostatic driver the combination comprising:
   a rechargeable battery operable when charged to generate a relatively low dc voltage;
   a charging circuit connected to said battery and coupled to said input terminal, said charging circuit including rectifier means for generating a charging current to said rechargeable battery when an audio signal is applied to said input terminal;
   a dc-to-dc converter circuit connected to said rechargeable battery and being operable when actuated to generate said polarizing voltage by boosting said relatively low battery voltage to a relatively high voltage; and
   switch means for actuating said dc-to-dc converter circuit when an audio signal is applied to said input terminal.

2. The high voltage power supply as recited in claim 1 in which said switch means includes a detector circuit which couples to said input terminal and which generates a preselected voltage when an audio signal is present at said input terminal, and an electronic switch which is responsive to said generated preselected voltage to actuate said dc-to-dc converter.

3. The high voltage power supply as recited in claim 2 in which said switch means includes time delay means coupled to said electronic switch to hold said dc-to-dc converter in its actuated state for a preselected time interval after said detector circuit ceases generation of said preselected voltage.

4. The high voltage power supply as recited in claim 1 in which said charging circuit includes varistor means connected in series with said input terminal for limiting the magnitude of the generated charging current and inhibiting the power coupled to said rectifier means at higher audio signal levels.

5. The high voltage power supply as recited in claim 4 in which said varistor means is an incandescent lamp.

6. The high voltage power supply as recited in claim 1 in which said dc-to-dc converter includes circuit means powered by said rechargeable battery for generating a voltage whose amplitude varies substantially as a function of time, and voltage multiplier means for receiving said time varying voltage and generating said relatively high polarizing voltage therefrom.

7. The high voltage power supply as recited in claim 6 in which said circuit means is an oscillator and said voltage multiplier means includes a step-up transformer having a secondary winding which connects to a voltage multiplier circuit.

8. The high voltage power supply as recited in claim 1 in which said charging circuit is coupled to said input terminal by a transformer having a primary winding coupled to said input terminal and a secondary winding connected to said rectifier means.

9. The high voltage power supply as recited in claim 8 in which said rectifying means includes an inductor connected in circuit with said secondary winding.

10. The high voltage power supply as recited in claim 8 in which said primary winding is coupled to said input terminal by a varistor which provides increased impedance at higher audio signal levels.

* * * * *